No. 724,528. PATENTED APR. 7, 1903.
I. G. WATERMAN.
ELECTROMAGNETIC VALVE CONTROLLING APPARATUS.
APPLICATION FILED FEB. 27, 1902.
NO MODEL.
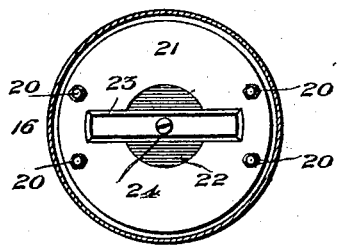
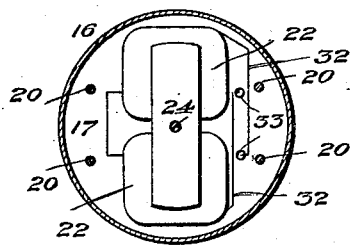
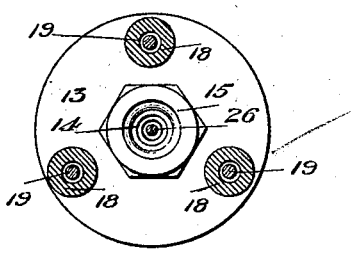
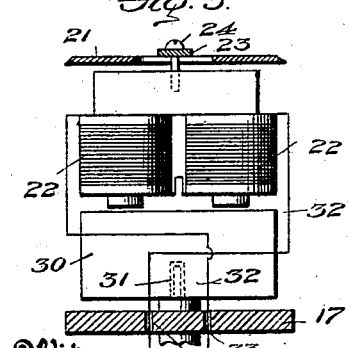
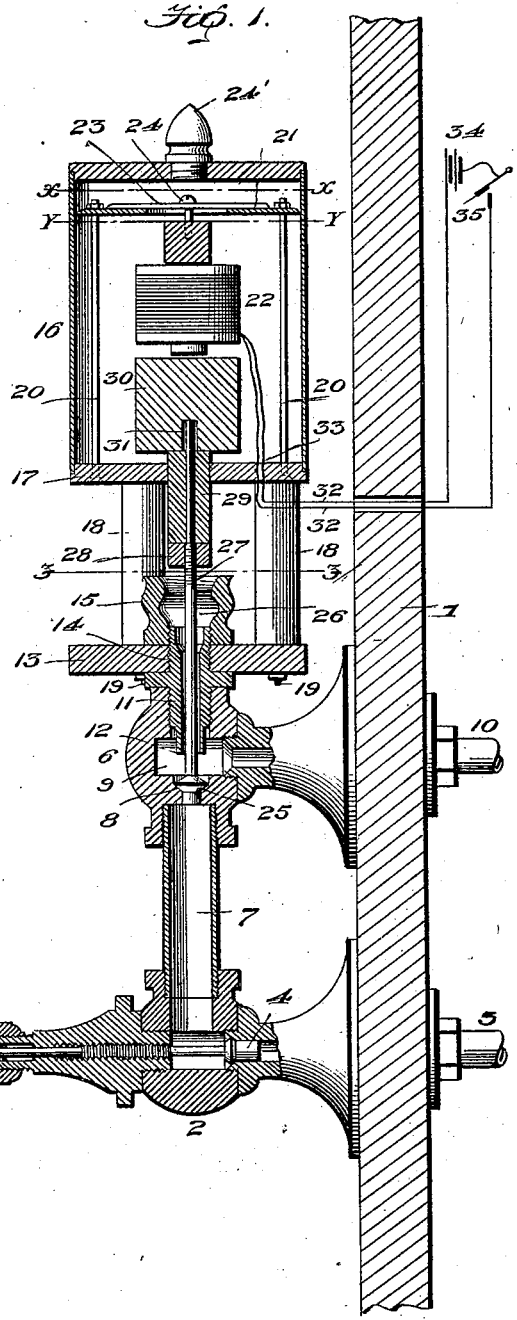
Witnesses
Inventor
Isaac G. Waterman
by Henry N. Capp
his Attorney

UNITED STATES PATENT OFFICE.

ISAAC G. WATERMAN, OF SANTA BARBARA, CALIFORNIA.

ELECTROMAGNETIC VALVE-CONTROLLING APPARATUS.

SPECIFICATION forming part of Letters Patent No. 724,528, dated April 7, 1903.

Application filed February 27, 1902. Serial No. 95,909. (No model.)

*To all whom it may concern:*

Be it known that I, ISAAC G. WATERMAN, a citizen of the United States, residing at Santa Barbara, county of Santa Barbara, and State of California, have invented certain new and useful Improvements in Electromagnetic Valve-Controlling Apparatus, of which the following is a specification.

This invention relates to electromagnetic valve-controlling apparatus.

The object of the invention is the provision of certain improvements on United States Letters Patent No. 682,007, granted to me September 3, 1901; and my object more particularly is to provide a simple and durable mechanism of this character which will be relatively inexpensive and intended for adjustment of the armature and electromagnet to regulate the action of the valve, as also to provide means whereby the valve will be automatically closed on the cessation of the flow of the current and wherein the pressure of the water or other fluid will be utilized to assist in opening the valve, as well as to provide means for preventing the flow of the water altogether when desired.

The present invention is particularly adapted for use in connection with the improvements in electrical control of the flow of water to basins of washstands set forth in my copending application, filed February 27, 1902, Serial No. 95,908.

Having the foregoing objects and others not specifically mentioned in view, the invention consists of certain improved features and novel coacting devices and mechanisms, as fully set forth hereinafter and recited in the appended claims.

In the accompanying drawings, Figure 1 is a vertical section of the complete apparatus; Fig. 2, a view on line $x$ $x$ of Fig. 1; Fig. 3, a view on line $y$ $y$ of Fig. 1; Fig. 4, a view on line $z$ $z$ of Fig. 1; and Fig. 5, a detail view, taken in front, of the magnet and armature.

The apparatus may be supported in vertical position on a suitable base 1.

The numeral 2 designates the casing or shell of the shut-off valve which is employed, said shell being secured to the base 1 and fed by a water-supply pipe 3. The valve itself is shown at 4 and provided on its stem with a suitable operating-handle 5. This valve is used to entirely shut off the supply of water whenever this may be desirable; but the valve is normally left open and the control of the flow of the water governed by the electromagnetic magnetism.

The casing for the electrically-controlled valve is shown at 6 and is in communication with the valve-case 2 of the shut-off valve by a short vertical pipe 7. The valve-seat is shown at 8, above which is the valve-chamber 9, which is in communication with the outlet-pipe 10, which may lead to the point where it is desired to supply the water.

Threaded into the top of the valve-casing or shell 6 is a coupling 11, having the depending portion 12 extending into the chamber 9, against which the valve abuts when raised to prevent the escape of water through said coupling and to insure its passing out through the discharge-pipe 10. This coupling is surmounted by a circular base 13, which is threaded onto the part 14 of the coupling, and the base is held in position by a nut 15. Above the base 13 is the hollow cylindrical casing 16 for the electromagnetic apparatus, this casing having a head 17, which rests on short pillars 18, through which extend tie-rods 19. From the head 17 arise within the casing 16 four rods 20, which support an annulus 21.

The numeral 22 designates a bipolar electromagnet which is adjustably suspended from a plate 23, extending diametrically of and resting on the annulus 21 through the medium of the adjusting-screw 24, which can be conveniently reached by removing the ornamental nut 24'. Provision is thereby made for vertical and circular adjustment of the electromagnet as found desirable.

The numeral 25 designates a valve adapted to rest on seat 8 and to close the opening through the depending portion 12 when raised, as heretofore explained, the stem of the valve being shown at 26 and rising loosely through the coupling 11 and nut 15 and having a screw-threaded portion 27, on which is a nut 28, above which is a sleeve 29, surrounding the stem and resting on the nut, and the armature 30 for the electromagnets rests upon the upper end of the sleeve 29 and is provided with a pocket 31, which receives the protruding open end of the valve-stem. This armature is made in the form of a relatively heavy block and of sufficient weight to keep the valve 25, normally on seat 8, against the full pressure of the water entering through the supply-pipe and standing in the pipe 7 to accomplish the seating by gravitation of the parts of said valve after the deënergization of the electromagnet. It will be seen, therefore, that in the present construction the energization of the magnet attracts the armature and allows the valve, valve-stem, nut, and sleeve to be raised by the pressure of the water, while immediately upon the deënergization of the magnet the valve will become reseated by the weight of the armature and movable parts. In consequence the weight of the valve, valve-seat, sleeve, and nut is not suspended from the armature, and the magnetic attraction is only to raise the armature itself. Furthermore, by adjusting the nut 28 the sleeve and armature can be raised or lowered, as desired, and adjustment can also be had through the medium of the screw 24, so that the normal space of separation between the poles of the magnet and the armature may be as great or as small as desired.

The wires 32 from the electromagnet may be carried out through an aperture 33 in the end or bottom of the magnet-case and embraced in any suitable circuit having the battery or generator 34 and switch or key 35.

I am aware that changes of construction and adaptation of parts could be resorted to in carrying out my invention without detracting from any of its advantages or essentially altering its form or operation, and I do not, therefore, limit myself to the precise constructions and arrangements herein shown and described, but consider myself entitled to all forms and modifications falling within the spirit and scope of the invention.

Having thus described my invention, what I claim as new, and desire to secure by Letters Patent, is—

1. In an electromagnetic valve-controlling apparatus, the combination with a valve having a valve-stem, of an electromagnet, an armature applied to the valve-stem, and means for adjusting the armature and electromagnet relatively of each other.

2. In an electromagnetic valve-controlling apparatus, the combination with a valve and valve-stem having a screw-threaded portion, of a relatively heavy armature having a socket or opening receiving the end of the valve-stem and adapted by its weight to keep the valve normally closed against the fluid-pressure, a nut on the screw-threaded portion of the valve-stem, a sleeve interposed between the nut and the armature, whereby the armature can be adjusted, and an electromagnet for attracting said armature.

3. In an electromagnetic valve-controlling apparatus, the combination with a valve and armature applied thereto, of a frame consisting of uprights, a cross-piece supported by said uprights, an electromagnet for the armature, and an adjustable suspending device connecting the electromagnet with the cross-piece, whereby the distance between the poles of the electromagnet and the armature can be varied.

4. The herein-described electromagnetic valve-controlling apparatus comprising a valve-casing, a base surmounting the valve-casing, pillars rising from the base, an electromagnet-case comprising a bottom seated on the pillars, and a frame rising from said bottom, an annulus supported by said frame, a cross-piece resting on said annulus, an electromagnet, an adjusting-screw suspending said electromagnet from the cross-piece, a valve in the valve-casing and provided with a stem extending up through the base and the bottom of the electromagnet-case, provided with a screw-threaded portion intermediate said base and bottom, a relatively heavy armature provided with a pocket which receives the end of the valve-stem and which keeps the valve normally seated against the fluid-pressure, a nut on said screw-threaded portion, and a sleeve interposed between the nut and the armature.

In testimony whereof I hereunto affix my signature in presence of two witnesses.

ISAAC G. WATERMAN.

Witnesses:
HENLEY C. BOOTH,
ALFRED C. HALL.